S. M. VAUCLAIN.
RACK LOCOMOTIVE.
APPLICATION FILED AUG. 18, 1914.
1,114,555.
Patented Oct. 20, 1914.
2 SHEETS—SHEET 2.
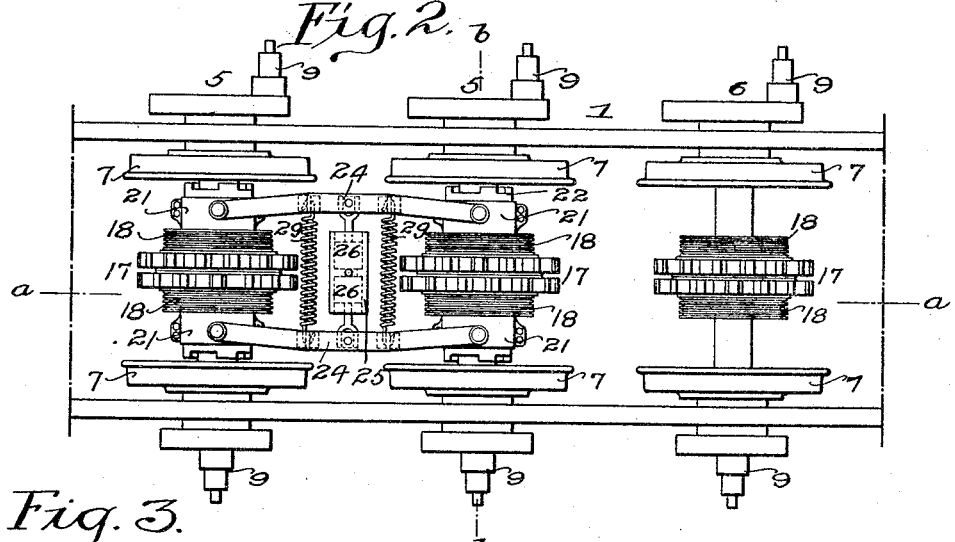
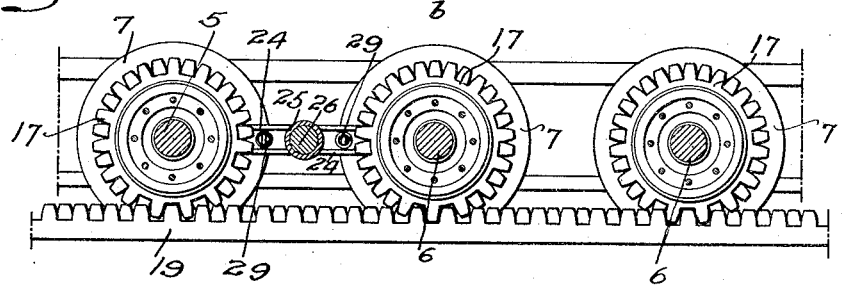
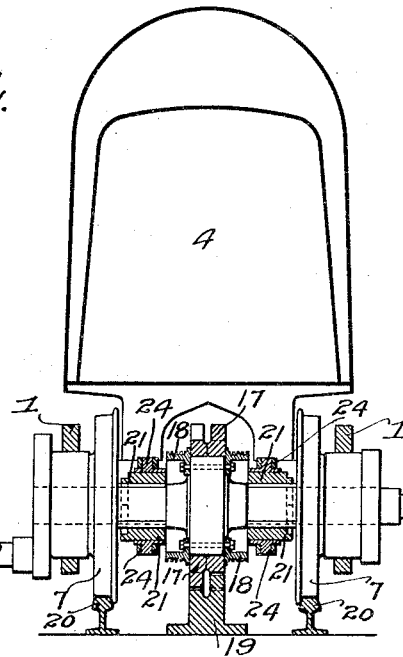

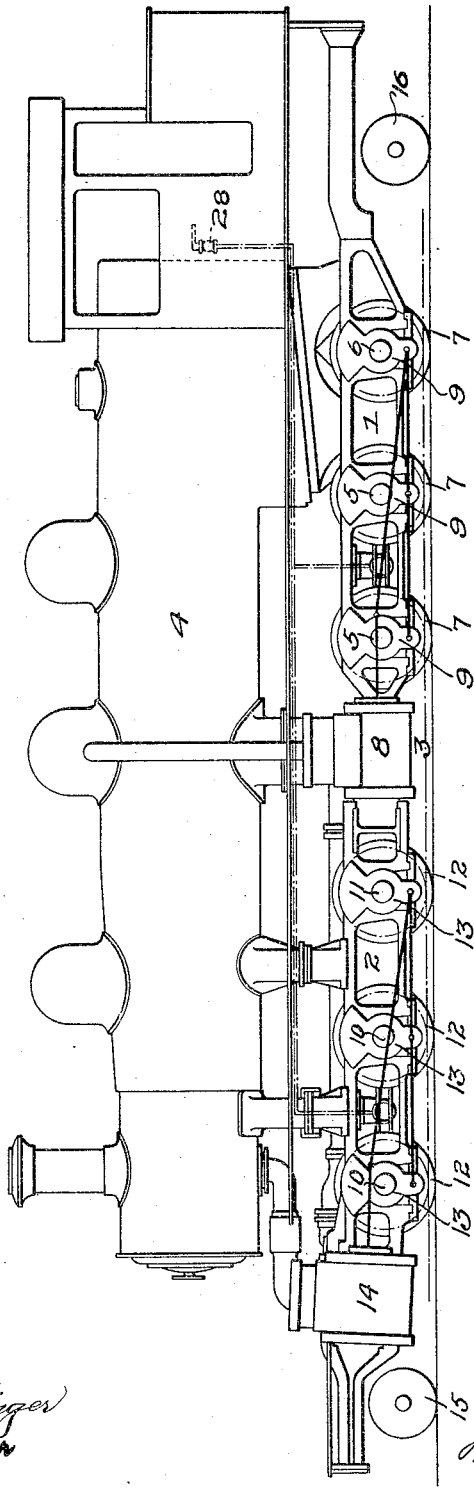

UNITED STATES PATENT OFFICE.

SAMUEL M. VAUCLAIN, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

RACK-LOCOMOTIVE.

1,114,555.      Specification of Letters Patent.      Patented Oct. 20, 1914.

Application filed August 18, 1914. Serial No. 857,346.

*To all whom it may concern:*

Be it known that I, SAMUEL M. VAUCLAIN, a citizen of the United States, residing in Philadelphia, Pennsylvania, have invented certain Improvements in Rack-Locomotives, of which the following is a specification.

The object of my invention is to mount rack mechanism on the two frames of an articulated locomotive of the "Mallet" type so that a locomotive of this character can be used on steep grades.

Heretofore, rack locomotives were comparatively light, but there is now a demand for heavier locomotives and by my invention two sets of rack mechanism may be applied to a single locomotive.

In the accompanying drawings: Figure 1 is a side view in diagram illustrating my improved rack locomotive; Fig. 2 is a plan view of a portion of one of the frames with the boiler removed; Fig. 3 is a longitudinal sectional view on the line $a$—$a$, Fig. 2; and Fig. 4 is a transverse sectional view on the line $b$—$b$, Fig. 2.

Referring to the drawings, 1 is the rear frame of a "Mallet" compound locomotive. 2 is the forward frame connected to the rear frame at 3 by any suitable hinged coupling.

4 is the boiler secured to the rear frame and overhanging the forward frame, being suitably supported thereon so as to allow the forward frame to swing independently of the boiler. In the present instance, the rear frame has three axles 5, 5, and 6 on which are loosely mounted the traction wheels 7. The high pressure cylinders 8 are located, one on each side of the rear frame, preferably at the forward end as shown and in each cylinder is a piston having a rod which is connected to the crank 9 of the axle 6 and this crank is connected in turn to the cranks 9 of the axles 5 by the ordinary connecting rods. Mounted in the forward frame 2 are axles 10 and 11 having traction wheels 12 and on the axles are cranks 13.

14, 14 are the low pressure cylinders, one located on each side of the forward end of the forward frame. The pistons of these cylinders are connected to the cranks on the axles in the manner similar to that described above.

15 15 are the forward truck wheels and 16, 16 are the trailer truck wheels, both shown in diagram.

Referring to Fig. 2, which represents the axles of the rear frame of the locomotive, there are two rack wheels 17 on each axle arranged side by side with the teeth staggered as shown in Fig. 3. 18, 18 are grooved brake drums, the brake mechanism being omitted to avoid confusion. The rack wheels 17 mesh with the rack 19, Fig. 3, located at the center of the track, while the wheels 7, which are flanged, travel on the rails 20, Fig. 4. The rack wheels may be secured to the axles in any suitable manner, the method illustrated in Fig. 4 being the one commonly used by me. The wheels 7 are loose on the axles, but I provide means whereby the wheels on the axles 5 may be clutched to the axle so as to be driven when the locomotive is used as a traction locomotive and not as a rack locomotive, but when the locomotive is used as a rack locomotive, then the wheels on all of the axles are loose. Splined to the axles 5 are clutch sleeves 21 having teeth 22 which engage corresponding teeth on the hubs of the wheels 7 of the axles 5, so that when the clutch sleeves are moved into engagement with the hubs they drive the traction wheels 7. 24, 24 are shifting bars which extend from one clutch sleeve to another on each side of the rack wheels and between these shifting bars is a cylinder 25 in which are mounted pistons 26 having rods which bear against bars 24. A pipe for supplying fluid under pressure leads from a valve 28 in the cab of the locomotive to the cylinder 25 so that when the valve is turned air will be admitted to the cylinders between the pistons, causing the pistons to separate and to force the shifting bars apart, causing the clutch sleeves to engage the traction wheels 7. Springs 29, on each side of the cylinder 25, are connected to the shifting bars 24, so that as soon as the air pressure is released the springs will draw the clutches at once away from the traction wheels 7. This same construction is applied to the wheels of the forward truck. This particular mechanism is set forth in an application filed by William A. Austin on the third day of December, 1912, Serial No. 734,704. Therefore, I lay no claim to the particular construction of the clutch operating mechanism.

By my improvement I am enabled to provide an exceedingly heavy and powerful locomotive having six rack wheels, all of which are driven, and which engage the rack when the locomotive is on an incline and I also provide means whereby four sets of traction wheels may be coupled to the axles so as to be driven when the racks are discontinued, the extra set of wheels on each frame being loosely mounted on the axles at all times.

Thus, by my invention I am enabled to construct a heavy rack locomotive, which can also be used as a traction locomotive.

I claim:

1. The combination in a locomotive, of two frames pivotally connected; three sets of axles mounted in each frame; traction wheels loose on each axle; cranks on each axle; rack wheels on all of the axles; and clutch mechanism on two of the axles of each frame arranged to engage the traction wheels so that when the clutches are moved into engagement with the said wheels, the wheels will turn with the axles.

2. The combination in a compound locomotive of the "Mallet" type, of two frames pivotally connected; a boiler on one frame and overhanging the other frame; high pressure cylinders on the forward frame; three axles on each frame; traction wheels loose on all of the axles; a crank on each axle; means for connecting the cranks with the pistons of their respective cylinders; rack wheels secured to all of said axles; clutch sleeves on two of the axles of each frame; and means for shifting the clutch sleeves so as to throw them into and out of engagement with the traction wheels mounted on said axles so that when the rack wheels are in engagement with the rack, all of the traction wheels are loose on the axles, but when the locomotive is to be driven by traction, then the two axles of each frame are clutched to their traction wheels.

In testimony whereof, I have signed my name to this specification, in the presence of two subscribing witnesses.

SAMUEL M. VAUCLAIN.

Witnesses:
R. H. SANFORD,
LEON THOMAS.